United States Patent
Lee et al.

(10) Patent No.: US 10,427,396 B2
(45) Date of Patent: Oct. 1, 2019

(54) SYSTEM AND METHOD FOR MANUFACTURING DISPLAY UNIT

(71) Applicant: LG CHEM, LTD., Seoul (KR)

(72) Inventors: Beom Seok Lee, Daejeon (KR); Suk Jae Lee, Daejeon (KR); Kyung Hyeok Park, Daejeon (KR); San Park, Daejeon (KR); Hang Suk Choi, Daejeon (KR); Eung Jin Jang, Daejeon (KR); Bong Su Jeung, Daejeon (KR); Jea Han Ryoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 191 days.

(21) Appl. No.: 15/605,416

(22) Filed: May 25, 2017

(65) Prior Publication Data
US 2017/0341363 A1    Nov. 30, 2017

(30) Foreign Application Priority Data

May 31, 2016 (KR) .......................... 10-2016-0067636

(51) Int. Cl.
*B32B 41/00* (2006.01)
*B32B 7/12* (2006.01)
(Continued)

(52) U.S. Cl.
CPC ................ *B32B 41/00* (2013.01); *B32B 7/12* (2013.01); *B32B 37/12* (2013.01); *B32B 38/10* (2013.01);
(Continued)

(58) Field of Classification Search
CPC ........... B32B 41/00; B32B 7/12; B32B 38/18; B32B 38/10; B32B 37/12; B32B 2307/40; B32B 2457/20; G02B 5/3033
(Continued)

(56) References Cited

U.S. PATENT DOCUMENTS

| | | | |
|---|---|---|---|
| 2012/0125531 A1 | 5/2012 | Hirata et al. | |
| 2013/0269869 A1* | 10/2013 | Hirata | B32B 38/10 |
| | | | 156/249 |
| 2017/0348957 A1* | 12/2017 | Park | B32B 27/08 |

FOREIGN PATENT DOCUMENTS

| | | |
|---|---|---|
| CN | 102478731 A | 5/2012 |
| KR | 10-2013-0101853 A | 9/2013 |
| KR | 10-2013-0116808 A | 10/2013 |

* cited by examiner

*Primary Examiner* — Michael N Orlando
*Assistant Examiner* — Joshel Rivera
(74) *Attorney, Agent, or Firm* — Dentons US LLP

(57) ABSTRACT

According to an exemplary embodiment of the present invention, there is provided a system for manufacturing a display unit, which includes: a carrying unit configured to carry an optical film, wherein the optical film includes a release film which is extended in a longitudinal direction, and a plurality of sheet pieces of a polarizing film which are arranged in a longitudinal direction and include adhesive layers, wherein the sheet piece of a polarizing film is adhered to the release film through the adhesive layer so that the polarizing film sheet piece is peeled from the release film; a peeling unit configured to fold back inwardly the release film of the optical film carried by the carrying unit toward an inner side and peel the polarizing film sheet piece from the release film; a winding unit configured to wind the release film peeled by the peeling unit; and an attachment unit configured to attach the polarizing film sheet piece peeled from the release film to one surface of a panel, while carrying the panel, the system including: a controller configured to adjust a position of a peeling point, at which the polarizing film sheet piece is peeled from the release film, by controlling the winding unit and the carrying unit.

12 Claims, 4 Drawing Sheets

(51) Int. Cl.
  *B32B 37/12*    (2006.01)
  *B32B 38/10*    (2006.01)
  *B32B 38/18*    (2006.01)
  *G02B 5/30*     (2006.01)
(52) U.S. Cl.
  CPC ............ *B32B 38/18* (2013.01); *G02B 5/3033* (2013.01); *B32B 2307/40* (2013.01); *B32B 2457/20* (2013.01)
(58) Field of Classification Search
  USPC .......................... 156/64, 350, 351, 378, 379
  See application file for complete search history.

SYSTEM AND METHOD FOR MANUFACTURING DISPLAY UNIT

This application claims the priority benefit of Korean Patent Application No. 10-2016-0067636 filed on May 31, 2016, which is incorporated herein by reference for all purposes as if fully set forth herein.

TECHNICAL FIELD

The present invention relates to a system and a method of manufacturing a display unit, and more particularly, to a system and a method of manufacturing a display unit, which minimizes inflow of foreign substances during a process of attaching a polarizing film sheet piece to one surface of a panel.

BACKGROUND ART

A display unit including a liquid crystal display (LCD), an organic light emitting diode (OLED), a plasma display panel (PDP), and an electrophoretic display (EPD) is manufactured through several processes. In order to manufacture the display unit, a polarizing film formed with an absorption axis is attached to one surface and the other surface of a panel. A process of attaching the polarizing film to one surface of the panel will be described below.

In the process of attaching the polarizing film to one surface of the panel, when an optical film including a polarizing film including an adhesive layer and a release film, which is attached to the adhesive layer so as to be peeled from the adhesive layer, is supplied, the supplied optical film is carried to an attachment position, at which a polarizing film sheet piece is attached to the panel, by a carrying unit. Before the optical film is transferred to the attachment position, a plurality of arranged polarizing film sheet pieces is formed on the optical film by cutting the optical film by a predetermined depth, in which the release film is not cut. In the optical film, on which the polarizing film sheet pieces are formed, the polarizing film sheet pieces are peeled from the release film by a peeling unit, and the peeled polarizing film sheet pieces are attached to one surface of the panel by an attachment unit.

A current system for manufacturing a display unit manufactures a display unit by installing an additional unit, which maintains an attachment unit in a clean state in order to prevent inflow of foreign substances during a process of attaching a polarizing film sheet piece to one surface of a panel. However, foreign substances on a surface of the optical film, foreign substances generated during the cut of the optical film, or foreign substances generated during the peeling of a release film flow into the polarizing film sheet piece, which is peeled from the release film and of which the adhesive layer is exposed, to cause a defect of the display unit.

Accordingly, there is required a system for manufacturing a display unit, which is capable of decreasing a defect of a display unit by minimizing a section and an area, into which foreign substances may flow during a process of attaching a polarizing film sheet piece.

DETAILED DESCRIPTION OF THE INVENTION

Technical Problem

The technical object to be accomplished by the present invention is to provide a system and a method of manufacturing a display unit, which are capable of decreasing a defect of a display unit by minimizing inflow of substances during a process of attaching a polarizing film sheet piece.

Technical Solution

An exemplary embodiment of the present invention provides a system for manufacturing a display unit, which includes: a carrying unit configured to carry an optical film, wherein the optical film includes a release film which is extended in a longitudinal direction, and a plurality of sheet pieces of a polarizing film which are arranged in a longitudinal direction and include adhesive layers, wherein the sheet piece of a polarizing film is adhered to the release film through the adhesive layer so that the polarizing film sheet piece is peeled from the release film; a peeling unit configured to fold back inwardly the release film of the optical film carried by the carrying unit toward an inner side and peel the polarizing film sheet piece from the release film; a winding unit configured to wind the release film peeled by the peeling unit; and an attachment unit configured to attach the polarizing film sheet piece peeled from the release film to one surface of a panel, while carrying the panel, the system including: a controller configured to adjust a position of a peeling point, at which the polarizing film sheet piece is peeled from the release film, by controlling the winding unit and the carrying unit.

The controller may control controls the winding unit and the carrying unit so that the shortest distance between one surface of the panel carried to the attachment unit and the peeling point is 0.1 to 150 mm.

The controller may control the winding unit and the carrying unit so that a distance between the peeling point and an attachment point, at which the polarizing film sheet piece peeled from the release film is attached to the panel, is L calculated by Equation 1 below to 27.5 mm, $$L = \frac{a}{\cos\Theta} \quad \text{[Equation 1]}$$

wherein a is a radius of an attachment roll positioned on one surface of the panel, and $\Theta$ is an angle between the polarizing film sheet piece carried to the attachment roll and the panel carried to the attachment roll.

a may be 10 to 20 mm, and $\Theta$ may be 10 to 40°.

The controller may control the winding unit and the carrying unit so that a horizontal distance between the peeling point and the attachment point, at which the polarizing film sheet piece peeled from the release film is attached to the panel is a to 2a, when a radius of the attachment roll positioned on one surface of the panel is a.

The controller control the winding unit and the carrying unit so that V1>V2 until the peeling point is shifted to a target peeling position which is spaced apart from the leading end of the peeling unit in a direction of the attachment unit by a predetermined interval, when a carrying speed of the optical film by the carrying unit is V1 and a winding speed of the release film by the winding unit is V2.

The controller may control the winding unit and the carrying unit so that V1=V2 when the peeling point is shifted to the target peeling position.

Another exemplary embodiment of the present invention provides a method of manufacturing a display unit, which includes: carrying an optical film, wherein the optical film includes a release film which is extended in a longitudinal direction, and a plurality of sheet pieces a polarizing film, which are arranged in a longitudinal direction and include adhesive layers, wherein the sheet piece of a polarizing film is adhered to the release film through the adhesive layer so that the sheet piece of a polarizing film is peeled from the release film, wherein the carrying is conducted by a carrying unit; peeling the sheet piece of a polarizing film from the release film by folding back inwardly the release film of the optical film carried by the carrying unit toward an inner side, wherein the peeling is conducted by a peeling unit; winding the release film peeled by the peeling unit, wherein the winding unit is conducted by a winding unit; and attaching the sheet piece of a polarizing film peeled from the release film to one surface of a panel, while carrying the panel, wherein the attaching is conducted by a attachment unit, the method includes: controlling the winding unit and the carrying unit so that a position of a peeling point, at which the sheet piece of a polarizing film is peeled from the release film, is adjusted.

The controlling may control the winding unit and the carrying unit so that a shortest distance between one surface of the carried panel and the peeling point is 0.1 to 150 mm.

The controlling may control the winding unit and the carrying unit so that a distance between the peeling point and an attachment point, at which the polarizing film sheet piece peeled from the release film is attached to the panel, is L calculated by Equation 1 below to 27.5 mm, $$L = \frac{a}{\cos\Theta}$$ [Equation 1]

wherein a is a radius of an attachment roll positioned on one surface of the panel, and $\Theta$ is an angle between the polarizing film sheet piece carried to the attachment roll and the panel carried to the attachment roll.

a may be 10 to 20 mm, and $\Theta$ may be 10 to 40°.

The controlling may control the winding unit and the carrying unit so that a horizontal distance between the peeling point and the attachment point, at which the polarizing film sheet piece peeled from the release film is attached to the panel is a to 2a, when a radius of the attachment roll positioned on one surface of the panel is a.

The controlling may control the winding unit and the carrying unit so that V1>V2 until the peeling point is shifted to a target peeling position which is spaced apart from the leading end of the peeling unit in a direction of the attachment unit by a predetermined interval, when a carrying speed of the optical film by the carrying unit is V1 and a winding speed of the release film is V2.

The controlling may control the winding unit and the carrying unit are controlled so that V1=V2 when the peeling point is shifted to the target peeling position.

Advantageous Effects

According to the exemplary embodiment of the present invention, it is possible to minimize inflow of foreign substances during a process of attaching the polarizing film sheet piece by adjusting a position of a peeling point.

BEST MODE

Figure 1:
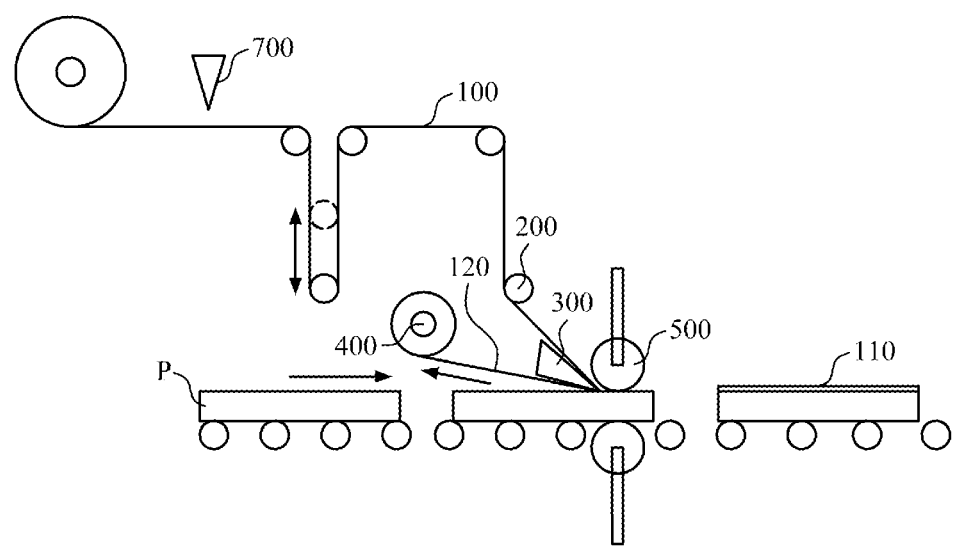
FIG. 1 is a diagram schematically illustrating a system for manufacturing a display unit according to an exemplary embodiment of the present invention.

Hereinafter, the exemplary embodiments of the present invention will be described more fully hereinafter with reference to the accompanying drawings so that those skilled in the art can easily carry out the present invention. However, the present invention may be implemented in various different forms, is not limited to the exemplary embodiments described herein. A part irrelevant to the description will be omitted in the drawings to clearly describe the present invention, and the same elements will be designated by the same reference numerals throughout the specification.

Terms used in the present specification will be briefly described, and the present invention will be described in detail.

As the terms used in the present invention, general terms, which are currently and widely used in consideration of a function in the present invention, have been selected, but may be changed according to the intentions of those skilled in the art or judicial precedents, appearance of new technology, or the like. Further, in a specific case, there is a term randomly selected by an applicant, and in this case, a meaning of the term will be described in detail in the corresponding description of the invention. Accordingly, the terms used in the present invention shall be defined based on the meaning of the term and the contents throughout the present invention, not the simple name of the term.

Throughout the specification, unless explicitly described to the contrary, the word "comprise" and variations such as "comprises" or "comprising" will be understood to imply the inclusion of stated elements but not the exclusion of any other elements.

Hereinafter, the present invention will be described in detail with reference to the accompanying drawing.

FIG. 1 is a diagram schematically illustrating a system for manufacturing a display unit according to an exemplary embodiment of the present invention.

An exemplary embodiment of the present invention provides a system for manufacturing a display unit, which includes a carrying unit 200, which carries an optical film 100, which includes a plurality of polarizing film sheet pieces 110 arranged in a longitudinal direction and including adhesive layers, and a release film 120, which is extended in the longitudinal direction and adheres so that the polarizing film sheet piece 110 may be peeled through the adhesive layer, a peeling unit 300, which folds back the release film 120 in the optical film 100 carried by the carrying unit 200 toward an inner side and peels the polarizing film sheet piece 110 from the release film 120, a winding unit 400, which winds the release film 120 peeled by the peeling unit 300, and an attachment unit 500, which carries a panel P, and attaches the polarizing film sheet piece 110 peeled from the release film 120 to one surface of the panel P, including a controller 600, which adjusts a position of a peeling point, at which the polarizing film sheet piece 110 is peeled from the release film 120, by controlling the winding unit 400 and the carrying unit 200.

According to the exemplary embodiment of the present invention, it is possible to minimize inflow of foreign substances during a process of attaching the polarizing film sheet piece by adjusting a position of a peeling point, at which the polarizing film sheet piece is peeled from the release film. Accordingly, it is possible to decrease a defect of the manufactured display unit.

For example, the system for manufacturing the display unit according to the exemplary embodiment of the present invention may attach the polarizing film sheet piece 110 to one surface of the panel P at a lower side of the panel P and reverse the panel P to attach the polarizing film sheet piece 110 to the other surface of the panel P at the lower side of the panel P. Further, the system for manufacturing the display unit according to the exemplary embodiment of the present invention may attach the polarizing film sheet piece 110 to the one surface of the panel P at an upper side of the panel P, and attach the polarizing film sheet piece 110 to the other surface of the panel P at the lower side of the panel P without reversing the panel P, and the system for manufacturing the display unit according to the exemplary embodiment of the present invention may attach the polarizing film sheet piece 110 to the one surface of the panel P at the lower side of the panel P, and attach the polarizing film sheet piece 110 to the other surface of the panel P at the upper side of the panel P without reversing the panel P.

The processes of attaching the polarizing film sheet piece 110 to the one surface and the other surface of the panel P may be the same, so that for convenience of the description, the present invention will be described in detail based on the process of attaching the polarizing film sheet piece 110 to the one surface of the panel P hereinafter.

The optical film 100 used in the system for manufacturing the display unit according to the exemplary embodiment of the present invention includes the polarizing film, and may further include a film having an optical characteristic, such as a phase difference film, a viewing angle compensating film, and a luminance improving film, in addition to the polarizing film. That is, the optical film 100, in which a film having an optical characteristic is attached to one surface or both surfaces of the polarizing film, may be used. The polarizing film may include, for example, a polarizer having a thickness of 5 to 80 µm, and a polarizer protective film, which is attached to one surface or both surfaces of the polarizer and has a thickness of about 1 to 500 µm.

Protective transparent film may be attached to the polarizing film and the film having the optical characteristic so as to protect the surfaces of the polarizing film and the film. For example, a triacetyl cellulose film and a polyethylenephthalate film may be used as the protective transparent film. An adhesive layer attachable to the panel P may be formed on one surface of the polarizing film, and the release film 120 for protecting the adhesive layer may be attached to the adhesive layer. The adhesive layer may be formed of, for example, an acryl-based adhesive, a silicon-based adhesive, or a urethane-based adhesive, and may have a thickness of 10 to 50 µm. For example, a polyethylene terephthalate-based film and a polyolefin-based film may be used as the release film 120.

The carrying unit 200 carries the optical film 100 including the polarizing film sheet piece 110 including the adhesive layer and the release film 120 adhering to the adhesive layer so as to be peeled off to a downstream side of the system for manufacturing the display unit of the present invention. The carrying unit 200 may carry the optical film 100, which is attached to one surface of the panel P and has a width corresponding to a length of a short side of the panel P, or the optical film 100, which is attached to the other surface of the panel P and has a width corresponding to a length of a long side of the panel P.

The carrying unit 200 may include various delivering means which are capable of transferring the optical film 100. For example, the carrying unit 200 may transfer the optical film 100 by using a conveyor belt or a roller.

The system for manufacturing the display unit according to the exemplary embodiment of the present invention may use the optical film 100 in a roll type. For example, the optical film obtained by attaching the plurality of polarizing film sheet pieces 110 including the adhesive layers to the release film 120 and winding the polarizing film sheet pieces 110 and the release film 120 in a roll type may be used as the roll-type optical film 100.

Further, when the roll-type optical film 100 is used, the system for manufacturing the display unit may include a cutting unit 700 forming slit lines (hereinafter, half-cuts), which do not cut the release film 120 on the optical film 100, but cut the polarizing film and the adhesive layer with a predetermined interval. The cutting unit 700 may sequentially form the slit line on the optical film 100 in a size corresponding to the panel P. For example, the cutting unit 700 may sequentially form the slit lines on the optical film 100, which is attached to one surface of the panel P and has a width corresponding to a length of a short side of the panel P, by an interval corresponding to a length of the long side of the panel P, and may sequentially form the slit lines on the optical film 100, which is attached to the other surface of the panel P and has a width corresponding to the length of the long side of the panel P, by an interval corresponding to a length of the short side of the panel P.

The cutting unit 700 may include various cutting means which are capable of cutting the optical film 100. For example, a laser device and a cutter may be used as the cutting unit.

The carried optical film 100 may go through an examination process before the slit line is formed by the cutting unit 700. In the examination process, light may be emitted to the optical film 100 by using a light source, an image of transmissive light or reflective light emitted from the optical film 100 in the emitted light may be photographed, and the image may be processed to examine a defect on the optical film 100. For example, a method of detecting a defect through a light and shade determination by binarization processing may be used as the image processing method. A position of the slit line formed on the optical film 100 may be determined by using location information of the defect calculated by the examination process.

By using the location information of the defect of the optical film 100 calculated in the examination process, the cutting unit 700 may form the slit line on the optical film 100 so that the defect is not included in the polarizing film sheet piece 110 attached to the panel. The polarizing film including the defect is not attached to the panel P and is excluded, so that it is possible to improve yield of the display unit.

The peeling unit 300 folds back the release film 120 in the optical film 100 carried by the carrying unit 200 toward the inner side and peels the polarizing film sheet piece 110 and the adhesive layer from the release film 120. For example, a knife edge portion may be formed at a leading end of the peeling unit 300, and a curvature radius of the knife edge portion may be 0.3 to 5.0 mm. The carrying direction of the release film 120 in the carried optical film 100 is changed at the leading end of the peeling unit 300, so that the release film 120 may be peeled from the polarizing film sheet piece 110. The peeled release film 120 is wound by the winding unit 400.

Figure 2:
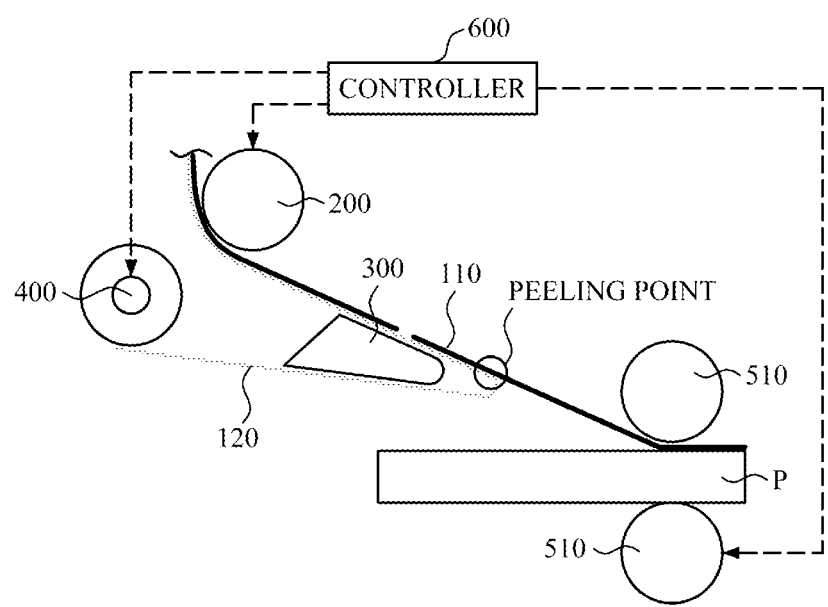
FIG. 2 is a diagram illustrating a process of attaching a polarizing film sheet piece to one surface of a panel according to an exemplary embodiment of the present invention.
Figure 3:
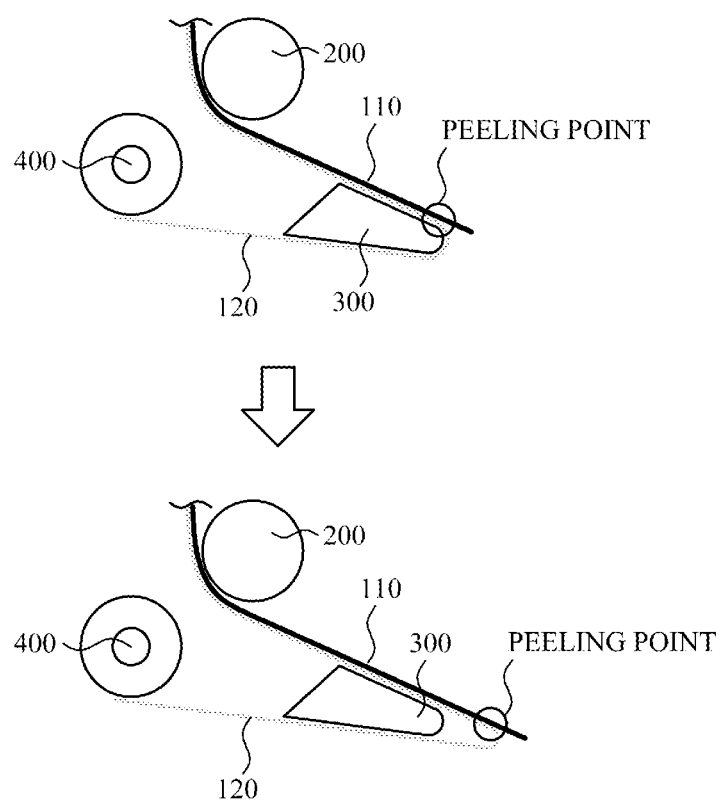
FIG. 3 is a diagram illustrating an adjustment of a position of a peeling point according to an exemplary embodiment of the present invention.

FIG. 2 is a diagram illustrating a process of attaching the polarizing film sheet piece to one surface of the panel according to the exemplary embodiment of the present invention, and FIG. 3 is a diagram illustrating an adjustment of a position of a peeling point according to the exemplary embodiment of the present invention.

According to the embodiment of the present invention, the controller 600 may adjust a position of a peeling point, at which the polarizing film sheet piece 110 is peeled from the release film 120, by controlling the winding unit 400 and the carrying unit 200.

When it is assumed that a carrying speed of the optical film 100 by the carrying unit 200 is V1 and a winding speed of the release film 120 by the winding unit 400 is V2, the controller 600 may control the winding unit 400 and the carrying unit 200 so that V1>V2 until the peeling point is shifted to a target peeling position which is spaced apart from the leading end of the peeling unit 300 in a direction of the attachment unit 500 by a predetermined interval. The target peeling position is a position between the leading end of the peeling unit 300 and the attachment unit 500, and may be determined by a selection of an operator.

The controller 600 is linked with the winding unit 400 and the carrying unit 200, and may control a winding speed for winding the release film 120 by controlling the winding unit 400, and control a carrying speed for carrying the optical film 100 to the peeling unit 300 or the attachment unit 500 by controlling the carrying unit 200. Further, referring to FIG. 2, during the process of attaching the polarizing film sheet piece 110, which is being peeled from the release film 120 by the peeling unit 300, to one surface of the panel P by the attachment unit 500, the controller 600 may control the carrying speed, at which the optical film 100 is carried to the peeling unit 300 by the carrying unit 200, to be equal to an attachment speed, at which the polarizing film sheet piece 110 is attached to the panel P by the attachment unit 500.

Referring to FIG. 3, the controller 600 may control the winding unit 400 and the carrying unit 200 so that V1>V2, and make the peeling point, at which the polarizing film sheet piece 110 is peeled from the release film 120, be formed at a position spaced apart from the leading end of the peeling unit 300 by a predetermined interval. The peeling point is formed at the target peeling position spaced apart from the leading end of the peeling unit 300 in the direction of the attachment unit 500 by the predetermined interval, so that the polarizing film sheet piece 110 may be peeled from the release film 120 while having a smaller peeling angle than that of the case where the polarizing film sheet piece 110 is peeled from the leading end of the peeling unit 300.

Accordingly, according to the exemplary embodiment of the present invention, the polarizing film sheet piece 110 is peeled from the release film 120 with the smaller peeling angle, so that it is possible to stably peel the polarizing film sheet piece 110, and it is possible to prevent vibrations of the polarizing film sheet piece 110 incurable during the peeling of the polarizing film sheet piece 110 from the release film 120, thereby suppressing bubbles from being generated in the manufactured display unit.

The controller 600 may control the carrying unit 200 and the winding unit 400 so that the carrying speed V1 and the winding speed V2 have the same speed and are decreased before V1>V2. Before V1>V2, the carrying speed V1 and the winding speed V2 are decreased and the polarizing film sheet piece 110 is peeled from the release film 120 at a low speed, so that the polarizing film sheet piece 110 may be more stably peeled from the release film 120.

The controller 600 according to the exemplary embodiment of the present invention may control the winding unit 400 and the carrying unit 200 so that V1=V2 when the peeling point is shifted to the target peeling position. The controller 600 shifts the peeling point from the leading end of the peeling unit 300 to the target peeling position spaced apart from the leading end of the peeling unit 300 by a predetermined interval by controlling the winding unit 400 and the carrying unit 200 so that V1>V2. Referring to FIG. 3, when the peeling point reaches the target peeling position, the controller 600 continuously locates the peeling point on the target peeling position by controlling the winding unit 400 and the carrying unit 200 so that V1=V2. The controller 600 makes the peeling point be maintained at the target peeling position by the time, at which the polarizing film sheet piece 110 is completely peeled from the release film 120, thereby maintaining stable peeling of the polarizing film sheet piece 110.

Further, when the polarizing film sheet piece 110 in the carried optical film 100 reaches the leading end of the peeling unit 300, V1 may be larger than V2 (V1>V2). As can be seen in FIG. 3, when an end of the polarizing film sheet piece 110 in the optical film 100 carried to the peeling unit 300 reaches the leading end of the peeling unit 300, the controller may control the winding unit 400 and the carrying unit 200 so that V1>V2.

Figure 4:
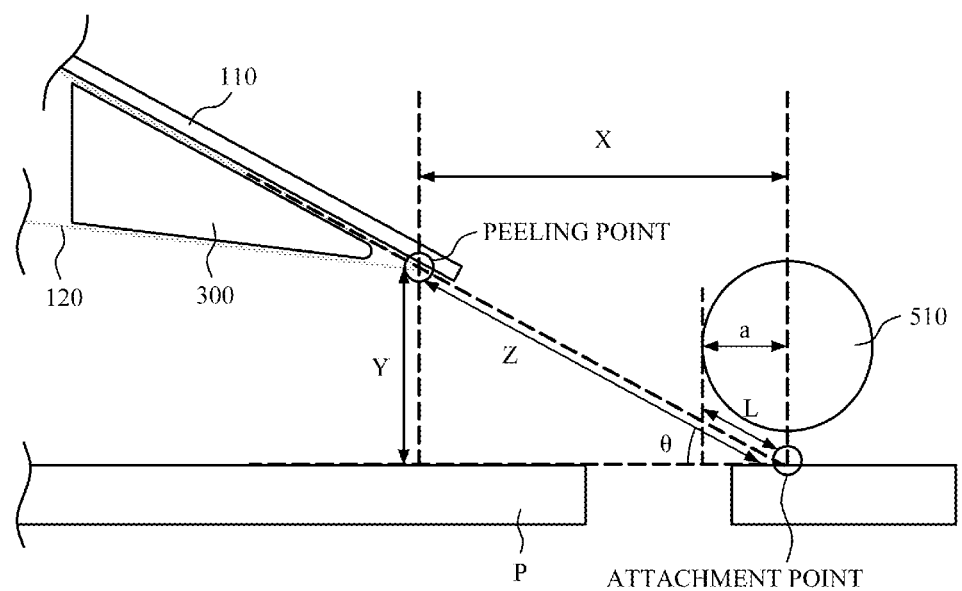
FIG. 4 is a diagram illustrating a position of a peeling point and an attachment point according to an exemplary embodiment of the present invention.

FIG. 4 is a diagram illustrating a position of the peeling point and an attachment point according to the exemplary embodiment of the present invention.

The controller 600 according to the exemplary embodiment of the present invention may control the winding unit 400 and the carrying unit 200 so that a shortest distance between one surface of the panel P carried to the attachment unit 500 and the peeling point is 0.1 to 150 mm.

Referring to FIG. 4, the controller 600 may adjust a position of the peeling point by controlling the carrying unit 200 and the winding unit 400 so that the shortest distance Y between the peeling point and one surface of the panel P carried to the attachment unit 500 is 0.1 to 150 mm. That is, the controller 600 may control the carrying unit 200 and the winding unit 400 so that the peeling point may be formed at a target peeling position, at which the shortest distance between the peeling point and one surface of the carried panel P is 0.1 to 150 mm.

Referring to FIGS. 3 and 4, the peeling point may be shifted from the leading end of the peeling unit 300 and may be shifted to the target peeling position, at which the shortest distance between the peeling point and one surface of the panel P is 0.1 to 150 mm by the controller 600. That is, the controller may control the carrying unit 200 and the winding unit 400 so that V1>V2 until the peeling point is shifted to the target peeling position, at which the shortest distance between the peeling point and one surface of the panel P is 0.1 to 150 mm.

In order to prevent the release film 120 peeled at the peeling point from sticking to the panel P carried to the attachment unit 500, and minimize inflow of foreign substances during the process of attaching the polarizing film sheet piece 110, a length of the shortest distance Y between the peeling point and one surface of the panel P may be 0.5 to 100 mm, and more preferably, 1 to 50 mm. However, the position of the peeling point may be adjusted according to a thickness of the release film 120, a thickness of the polarizing film sheet piece 110, and the like.

The controller 600 according to the exemplary embodiment of the present invention may control the winding unit 400 and the carrying unit 200 so that a distance between the peeling point and the attachment point, at which the polarizing film sheet piece 110 peeled from the release film 120 is attached to the panel P, is L, which is obtained from Equation 1 below, to 27.5 mm.

$$L = \frac{a}{\cos\Theta} \qquad \text{[Equation 1]}$$

a is a radius of an attachment roll 510 positioned on the one surface of the panel P, and Θ is an angle between the polarizing film sheet piece 110 carried to the attachment roll 510 to the panel P carried and the attachment roll 510.

The attachment unit 500 may include a pair of attachment rolls 510, and the pair of attachment rolls 510 may be positioned in one surface of the panel P, to which the polarizing film sheet piece 110 peeled from the release film 120 is attached, and the other surface of the panel P facing the one surface of the panel P, respectively.

The attachment point may be a point, which is vertical to a center axis of the attachment roll 510, in the point, at which the polarizing film sheet piece 110 peeled from the release film 120 is attached to the panel P.

Referring to FIG. 4, the controller 600 may control the carrying unit 200 and the winding unit 400 so that the peeling point may be formed at a target peeling position, at which a distance between the peeling point and the attachment point is L to 27.5 mm. That is, the controller may control the carrying unit 200 and the winding unit 400 so that V1>V2 until the peeling point is shifted to the target peeling position, at which the distance between the peeling point and the attachment point is L to 27.5 mm.

Referring to FIG. 4, a distance Z between the peeling point and the attachment point is related to an area of the polarizing film sheet piece 110, which is peeled from the release film 120 so that the adhesive layer is exposed to the outside. As can be seen in FIG. 4, the peeling point may have a right-angled triangular shape formed of the distance Z between the peeling point and the attachment point, the shortest distance Y between the peeling point and one surface of the carried panel P, and the distance X between the peeling point and the attachment point in a horizontal direction with respect to the attachment point. Accordingly, the distance between the peeling point and the attachment point may be calculated by Equation 2 below.

$$Z^2 = X^2 + Y^2 \qquad \text{[Equation 2]}$$

That is, the distance between the peeling point and the attachment point may be changed by a position of the peeling point, and it can be seen that when X and Y are small, Z is small.

Foreign substances on the surface of the optical film 100, foreign substance generated during the cutting of the optical film 100, and foreign substances generated during the peeling of the release film 120 may flow into the polarizing film sheet piece 110, which is peeled from the release film 120 and is exposed, to cause a defect of the display unit. Accordingly, it is possible to restrict the inflow of the foreign substances during the process of attaching the polarizing film sheet piece 110 by minimizing the distance Z between the peeling point and the attachment point. The carrying unit 200 and the winding unit 400 are controlled by the controller 600, so that the peeling point may be shifted from the leading end of the peeling unit 300 to the target peeling position, at which the distance L between the peeling point and the attachment point is L to 27.5 mm.

However, the distance Z between the peeling point and the attachment point may be larger than L calculated by Equation 1 below. Referring to FIG. 4, the right-angled triangular shape, which has a as a bottom side corresponding to the radius of the attachment roll 510, has L as a hypotenuse, and has Θ, which is an angle between the polarizing film sheet piece 110 carried to the attachment roll 510 and the panel P carried to the attachment roll 510, as an included angle of the bottom side and the hypotenuse, may be formed around the attachment point. Accordingly, for the right-angled triangular shape, a cosine function cos Θ may be defined by Equation 3 below.

$$\cos\Theta = \frac{a}{L} \qquad \text{[Equation 3]}$$

Through Equation 3, Equation 1 for L may be obtained. In order to install an additional unit, which is capable of maintaining a clean state of the attachment unit 500, or an additional unit for removing static electricity generable during the peeling of the release film 120 in the attachment unit 500, and prevent the release film 120 peeled at the peeling point from being sucked into a lower side of the attachment roll 510 having the radius a, the distance between the peeling point and the attachment point may be larger than L calculated by Equation 1.

Further, in order to minimize a section, into which foreign substance may flow during the process of attaching the polarizing film sheet piece 110, and an area of the section, the distance between the peeling point and the attachment point may be smaller than 26 mm. However, the distance between the peeling point and the attachment point may be adjusted according to a radius of the attachment roll, a thickness of the polarizing film sheet piece, a thickness of the release film, and the like used for manufacturing the display unit.

When the release film 120 is folded back at the leading end of the peeling unit 300 and peeled off, foreign substances may be generated on the surface of the release film 120 by friction between the release film 120 and the leading end of the peeling unit 300. However, as can be seen in FIG. 4, according to the exemplary embodiment of the present invention, the peeling point is formed at the position, which is spaced apart from the leading end of the peeling unit 300 by the predetermined interval, so that it is possible to suppress foreign substances from being generated by the friction between the leading end of the peeling unit 300 and the release film 120.

Accordingly, the system for manufacturing the display unit according to the exemplary embodiment of the present invention may minimize the inflow of foreign substances while normally attaching the polarizing film sheet piece to the panel.

According to the exemplary embodiment of the present invention, a may be 10 to 20 mm, and Θ may be 10 to 40°. A roll having a radius of 10 to 20 mm may be used as the attachment roll 510. A roll having a radius of 10 to 18 mm may be used as the attachment roll 510, and more preferably, a roll having a radius of 10 to 15 mm may be used as the attachment roll 510.

Further, it is possible to adjust a carrying direction of the optical film 100 so that the angle between the polarizing film sheet piece 110 carried to the attachment roll 510 and the panel P carried to the attachment roll 510 is 10 to 40°. The angle between the polarizing film sheet piece 110 and the panel P may be 15 to 35°, and more preferably, 20 to 30°.

When it is assumed that a radius of the attachment roll positioned on one surface of the panel is a, the controller according to the exemplary embodiment of the present invention may control the winding unit and the carrying unit so that a horizontal distance between the peeling point and the attachment point, at which the polarizing film sheet piece peeled from the release film is attached to the panel is a to 2a.

Referring to FIG. 4, the controller may control the winding unit and the carrying unit so that the horizontal distance X between the peeling point and the attachment point is a to 2a. In order to prevent the release film peeled at the peeling point from being sucked into a space between the lower portion of the attachment roll positioned at the attachment point and the panel, the horizontal distance between the peeling point and the attachment point may be larger than a.

Further, in order to minimize a section, into which foreign substance may flow during the process of attaching the polarizing film sheet piece 110, and an area of the section, the horizontal distance between the peeling point and the attachment point may be smaller than 1.8a, and more preferably, may be smaller than 1.5a.

Accordingly, according to the exemplary embodiment of the present invention, it is possible to minimize foreign substances from flowing into the polarizing film sheet piece, which is peeled from the release film and exposed, by controlling the horizontal distance between the peeling point and the attachment point.

The display unit manufactured by attaching the polarizing film sheet piece 110 to one surface and the other surface of the panel P may be transferred by a transferring unit. For example, a carrying roller or a conveyor belt may be used as the transferring unit.

Another exemplary embodiment of the present invention provides a method of manufacturing a display unit, which includes a carrying operation of carrying, by a carrying unit 200, an optical film 100, which includes a plurality of polarizing film sheet pieces 110, which is arranged in a longitudinal direction and includes adhesive layers, and a release film 120, which is extended in the longitudinal direction and adheres so that the polarizing film sheet piece 110 may be peeled through the adhesive layer, a peeling operation of peeling, by a peeling unit 300, the polarizing film sheet piece 110 from the release film 120 by folding back the release film 120 in the optical film 100 carried by the carrying unit 200 toward an inner side, a winding operation of winding, by the winding unit 400, the release film 120 peeled by the peeling unit 300, and an attaching operation of attaching, by an attachment unit 500, the polarizing film sheet piece 110 peeled from the release film 120 to one surface of the panel P while carrying the panel P, including a control operation of adjusting a position of a peeling point, at which the polarizing film sheet piece 110 is peeled from the release film 120, by controlling the winding unit 400 and the carrying unit 200.

According to the method of manufacturing the display unit according to another exemplary embodiment of the present invention, it is possible to minimize inflow of foreign substances in the attaching operation, thereby decreasing a defect of the manufactured display unit.

A process of attaching the polarizing film sheet piece 110 to the other surface of the panel P may be performed in the same manner as that of the process of attaching the polarizing film sheet piece 110 to one surface of the panel P, so that hereinafter, for convenience of description, the present invention will be described in detail based on the process of attaching the polarizing film sheet piece 110 to one surface of the panel P.

In the process of attaching the polarizing film sheet piece 110 to one surface of the panel P according to another exemplary embodiment of the present invention, the optical film 100 including the polarizing film sheet pieces 110 arranged in the longitudinal direction and including the adhesive layers, and the release film 120, which is extended in the longitudinal direction and adheres so that the polarizing film sheet piece 110 may be peeled through the adhesive layer, is supplied. The polarizing film sheet pieces 110 are formed by unwinding and carrying the supplied optical film 100, and cutting the polarizing film and the adhesive layer by a predetermined interval without cutting the release film 120 on the carried optical film. Then, the polarizing film sheet piece 110 including the adhesive layer is peeled from the release film 120 by folding back the release film 120 in an inner direction at a target peeling position, which is spaced apart from a leading end of the peeling unit 300 by a predetermined interval and carrying the release film 120. Then, the polarizing film sheet piece 110 is attached to one surface of the panel P through the adhesive layer.

In the control operation according to the exemplary embodiment of the present invention, when it is assumed that a carrying speed of the optical film 100 by the carrying unit 200 is V1 and a winding speed of the release film 120 by the winding unit 400 is V2, the winding unit 400 and the carrying unit 200 may be controlled so that V1>V2 until the peeling point is shifted to a target peeling position which is spaced apart from the leading end of the peeling unit 300 in a direction of the attachment unit 500 by a predetermined interval.

The target peeling position is a position between the leading end of the peeling unit 300 and the attachment unit 500, and may be determined by a selection of an operator. For example, the target peeling position may be set to a point, at which a shortest distance between the peeling point and one surface of the carried panel P is 0.1 to 150 mm.

In the control operation, it is possible to shift the peeling point from the leading end of the peeling unit 300 to the target peeling position, which is spaced apart from the leading end of the peeling unit 300 by the predetermined interval by controlling the carrying unit 200 and the winding unit 400. It is possible to decrease a defect of the manufactured display unit by shifting the peeling point to the target peeling position, at which a section, into which foreign substances may flow in the attaching operation, may be minimized.

Further, in the control operation, the winding unit 400 and the carrying unit 200 may be controlled so that V1=V2 when the peeling point is shifted to the target peeling position.

In the control operation, the peeling point may be continuously positioned on the target peeling position by controlling the winding unit 400 and the carrying unit 200 so that V1=V2 when the peeling point reaches the target peeling position. The peeling point is maintained at the target peeling position by the time, at which the polarizing film sheet piece 110 is completely peeled from the release film 120, thereby maintaining the stable peeling of the polarizing film sheet piece 110. Further, it is possible to suppress foreign substances generable on the surface of the release film 120 by friction between the release film 120 and the leading end of the peeling unit 300 by peeling the polarizing film sheet piece 110 from the release film 120 at the target peeling position, which is spaced apart from the leading end of the peeling unit 300 by the predetermined interval.

Accordingly, in the control operation, it is possible to stably peel the polarizing film sheet piece 110 from the release film 120 and suppress foreign substances generable in the peeling operation by controlling the winding unit 400 and the carrying unit 200, thereby decreasing a defect of the manufactured display unit.

In the control operation according to the exemplary embodiment of the present invention, it is possible to control the winding unit 400 and the carrying unit 200 so that a shortest distance between one surface of the carried panel P and the peeling point is 0.1 to 150 mm.

In the control operation, it is possible to control the carrying unit 200 and the winding unit 400 so that V1>V2 until the peeling point is shifted to the target peeling position, at which the shortest distance between the peeling point and one surface of the panel P is 0.1 to 150 mm.

In the control operation, the shortest distance between the peeling point and one surface of the panel P is 0.1 to 150 mm, so that it is possible to prevent a phenomenon, in which the release film 120 peeled in the peeling operation sticks to the panel P carried to the attachment unit 500, and minimize inflow of foreign substances into the polarizing film sheet piece 110, of which the adhesive layer is exposed, in the attaching operation.

In the control operation according to another exemplary embodiment of the present invention, it is possible to control the winding unit 400 and the carrying unit 200 so that a distance between the peeling point and the attachment point, at which the polarizing film sheet piece 110 peeled from the release film 120 is attached to the panel P, is L, which is obtained from Equation 1 below, to 27.5 mm.

$$L = \frac{a}{\cos\Theta}$$ [Equation 1]

a is a radius of an attachment roll 510 positioned on the one surface of the panel P, and $\Theta$ is an angle between the polarizing film sheet piece 110 carried to the attachment roll 510 to the panel P carried and the attachment roll 510.

In the control operation, it is possible to control the carrying unit 200 and the winding unit 400 so that V1>V2 until the peeling point is shifted to the target peeling position, at which the distance between the peeling point and the attachment point is L to 27.5 mm.

In the control operation, the distance between the peeling point and the attachment point is L to 27.5 mm, so that it is possible to minimize an area of the polarizing film sheet piece 110, which is peeled from the release film 120 so that the adhesive layer is exposed, and suppress inflow of foreign substances in the attaching operation.

a may be 10 to 20 m, and $\Theta$ may be 10 to 40°. A radius of the attachment roll 510 and an angle of the supply of the polarizing film sheet piece 110 may be set according to a selection of an operator.

In the control operation according to another exemplary embodiment of the present invention, when it is assumed that a radius of the attachment roll positioned on one surface of the panel is a, it is possible to control the winding unit and the carrying unit so that a horizontal distance between the peeling point and the attachment point, at which the polarizing film sheet piece peeled from the release film is attached to the panel, is a to 2a.

The method of manufacturing the display unit according to another exemplary embodiment of the present invention may minimize an area of the polarizing film sheet piece 110, which is peeled from the release film 120 so that the adhesive layer is exposed to the outside, by controlling the shortest distance between the peeling point and one surface of the panel P and the distance between the peeling point and the attachment point, thereby decreasing flow of foreign substances into the polarizing film sheet piece 110 in the attaching operation.

The above description of the present invention is illustrative, and those skilled in the art to which the present invention pertains may understand that modifications to other particular forms may be easily made without changing the technical spirit or the essential feature of the present invention. Thus, it is to be appreciated that embodiments described above are intended to be illustrative in every sense, and not restrictive. For example, each constituent element described in a singular form may be distributed and carried out, and similarly, constituent elements described in a distributed form may be carried out in a combination form.

The scope of the present invention is represented by the claims to be described below rather than the detailed description, and it is to be interpreted that the meaning and scope of the claims and all the changes or modified forms derived from the equivalents thereof come within the scope of the present invention.

EXPLANATION OF REFERENCE NUMERALS AND SYMBOLS

100: Optical film
110: Polarizing film sheet piece
120: Release film
200: Carrying unit
300: Peeling unit
400: Winding unit
500: Attachment unit
510: Attachment roll
600: Controller
700: Cutting unit

The invention claimed is:

1. A system for manufacturing a display unit, which comprises:
a carrying unit configured to carry an optical film, wherein the optical film includes a release film which is extended in a longitudinal direction, and a plurality of sheet pieces of a polarizing film which are arranged in a longitudinal direction and include adhesive layers, wherein the sheet piece of a polarizing film is adhered to the release film through the adhesive layer so that the polarizing film sheet piece is peeled from the release film;
a peeling unit configured to fold back inwardly the release film of the optical film carried by the carrying unit toward an inner side and peel the polarizing film sheet piece from the release film;
a winding unit configured to wind the release film peeled by the peeling unit; and
an attachment unit configured to attach the polarizing film sheet piece peeled from the release film to one surface of a panel, while carrying the panel,
the system comprising: a controller configured to adjust a position of a peeling point, at which the polarizing film sheet piece is peeled from the release film, by controlling the winding unit and the carrying unit, and wherein the shortest distance between one surface of the panel carried to the attachment unit and the peeling point is 0.1 to 150 mm.

2. The system of claim 1, wherein a distance L between the peeling point and an attachment point, at which the polarizing film sheet piece peeled from the release film is attached to the panel, as calculated by Equation 1 below, is 27.5 mm:

$$L = \frac{a}{\cos\Theta},\qquad \text{[Equation 1]}$$

wherein a is a radius of an attachment roll positioned on one surface of the panel, and $\Theta$ is an angle between the polarizing film sheet piece carried to the attachment roll and the panel carried to the attachment roll.

3. The system of claim 2, wherein a is 10 to 20 mm, and $\Theta$ is 10 to 40°.

4. The system of claim 1, wherein a horizontal distance between the peeling point and the attachment point, at which the polarizing film sheet piece peeled from the release film is attached to the panel is a to 2a, when a radius of the attachment roll positioned on one surface of the panel is a.

5. The system of claim 1, wherein, when a carrying speed of the optical film by the carrying unit is V1 and a winding speed of the release film by the winding unit is V2, V1>V2 until the peeling point is shifted to a target peeling position which is spaced apart from the leading end of the peeling unit in a direction of the attachment unit by a predetermined interval.

6. The system of claim 5, wherein V1=V2 when the peeling point is shifted to the target peeling position.

7. A method of manufacturing a display unit, which comprises:
  carrying an optical film, wherein the optical film includes a release film which is extended in a longitudinal direction, and a plurality of sheet pieces a polarizing film, which are arranged in a longitudinal direction and include adhesive layers, wherein the sheet piece of a polarizing film is adhered to the release film through the adhesive layer so that the sheet piece of a polarizing film is peeled from the release film, wherein the carrying is conducted by a carrying unit;
  peeling the sheet piece of a polarizing film from the release film by folding back inwardly the release film of the optical film carried by the carrying unit toward an inner side, wherein the peeling is conducted by a peeling unit;
  winding the release film peeled by the peeling unit, wherein the winding unit is conducted by a winding unit; and
  attaching the sheet piece of a polarizing film peeled from the release film to one surface of a panel, while carrying the panel, wherein the attaching is conducted by a attachment unit,
  the method comprising: controlling the winding unit and the carrying unit so that a position of a peeling point, at which the sheet piece of a polarizing film is peeled from the release film, is adjusted,
  wherein the controlling controls the winding unit and the carrying unit so that a shortest distance between one surface of the carried panel and the peeling point is 0.1 to 150 mm.

8. The method of claim 7, wherein the controlling controls the winding unit and the carrying unit so that a distance between the peeling point and an attachment point, at which the polarizing film sheet piece peeled from the release film is attached to the panel, is L calculated by Equation 1 below to 27.5 mm, $$L = \frac{a}{\cos\Theta}\qquad \text{[Equation 1]}$$

wherein a is a radius of an attachment roll positioned on one surface of the panel, and $\Theta$ is an angle between the polarizing film sheet piece carried to the attachment roll and the panel carried to the attachment roll.

9. The method of claim 8, wherein a is 10 to 20 mm, and $\Theta$ is 10 to 40°.

10. The method of claim 7, wherein the controlling controls the winding unit and the carrying unit so that a horizontal distance between the peeling point and the attachment point, at which the polarizing film sheet piece peeled from the release film is attached to the panel is a to 2a, when a radius of the attachment roll positioned on one surface of the panel is a.

11. The method of claim 7, wherein the controlling controls the winding unit and the carrying unit so that V1>V2 until the peeling point is shifted to a target peeling position which is spaced apart from the leading end of the peeling unit in a direction of the attachment unit by a predetermined interval, when a carrying speed of the optical film by the carrying unit is V1 and a winding speed of the release film is V2.

12. The method of claim 11, wherein the controlling controls the winding unit and the carrying unit are controlled so that V1=V2 when the peeling point is shifted to the target peeling position.

* * * * *